United States Patent
Hai et al.

(10) Patent No.: US 9,625,763 B2
(45) Date of Patent: Apr. 18, 2017

(54) LIQUID CRYSTAL DISPLAY

(71) Applicant: SHENZHEN CHINA STAR OPTOELECTRONICS TECHNOLOGY CO., LTD., Shenzhen, Guangdong (CN)

(72) Inventors: Bo Hai, Guangdong (CN); Chihtsung Kang, Guangdong (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 134 days.

(21) Appl. No.: 14/417,521

(22) PCT Filed: Jan. 4, 2015

(86) PCT No.: PCT/CN2015/070042
§ 371 (c)(1),
(2) Date: Jan. 30, 2015

(87) PCT Pub. No.: WO2016/101338
PCT Pub. Date: Jun. 30, 2016

(65) Prior Publication Data
US 2016/0187727 A1 Jun. 30, 2016

(30) Foreign Application Priority Data
Dec. 25, 2014 (CN) .......................... 2014 1 0819969

(51) Int. Cl.
*G02F 1/1335* (2006.01)
*G02F 1/13363* (2006.01)

(52) U.S. Cl.
CPC .................. *G02F 1/133634* (2013.01); *G02F 2001/133637* (2013.01); *G02F 2413/02* (2013.01)

(58) Field of Classification Search
None
See application file for complete search history.

(56) References Cited

U.S. PATENT DOCUMENTS

2015/0146142 A1* 5/2015 Kang ................ G02F 1/133634
349/102

* cited by examiner

*Primary Examiner* — Richard Kim
(74) *Attorney, Agent, or Firm* — Hauptman Ham, LLP

(57) ABSTRACT

An LCD includes a first TAC film, a first optical uniaxial phase compensating film, an LC cell, a second optical uniaxial phase compensating film and a second TAC film from the incident surface to the emitting surface. The first optical uniaxial phase compensating film is used for providing a first compensating value and a second compensating value by adjusting thickness and by adjusting a first refractive index, a second refractive index, and a third refractive index. The second optical uniaxial phase compensating film is used for providing a third compensating value by adjusting thickness and by adjusting a fourth refractive index, a fifth refractive index, and a sixth refractive index. Leakage of light is controlled according to the first compensating value, the second compensating value, and the third compensating value in the LCD.

7 Claims, 12 Drawing Sheets

-Prior art-

-Prior art-

LIQUID CRYSTAL DISPLAY

BACKGROUND OF THE INVENTION

1. Field of the Invention

The present invention relates to a liquid crystal display (LCD), and more particularly, to an LCD comprising an optical uniaxial phase compensating film.

2. Description of the Prior Art

Owing to their low-profile, thin, and lightweight features, LCDs have become the mainstream display devices in recent years. Liquid crystal screens are widely used in electronic devices such as cellphones, personal digital assistants (PDAs), digital cameras, computers, notebooks, etc.

An LCD comprises an LC cell. An alignment of LC molecules in the LC cell is determined by variation of an electric field applied on the LC cell, and the transmission of light in the LC cell is adjusted accordingly. An LC material has a property of birefringence, which means that the refractive index of light in the direction of the long axis of the molecules is different from the refractive index of light in the direction of the short axis of the molecules. Therefore, linearly polarized incident light has diverse phases through different paths in the LC cell in the polarized direction. The feature of color and the transmission of light at a slant viewing angle are different from those at a front viewing angle.

Birefringence index of the LC molecules in the LC cell varies with an observation inclination. With the observation inclination increases, both of the contrast ratio of an image and image resolution decrease. To enhance the contrast ratio of the image obviously at a specific viewing angle and to reduce leakage of light in dark state on the LCD, a compensating film is attached to the LC panel of a conventional LCD. The birefringence of the LC molecules can be symmetrically compensated because the retardation value of light in different directions is compensated using the compensating film.

Please refer to FIG. 1 and FIG. 2, FIG. 1 shows a simulation of a distribution of light leakage in dark state after being compensated by a conventional uniaxial retardation film. FIG. 2 shows a simulation of a distribution of contrast over all viewing angles after being compensated by the conventional uniaxial retardation film. The optical path difference of liquid crystal $\Delta n \times d$ is set at 315 nm. The retardation values Ro and Rth of the A plate retardation film are 58 nm and 220 nm, respectively, and the retardation value Rth of the C plate is 40 nm. As can be seen from FIG. 1 and FIG. 2, under these circumstances there is severe light leakage problem in a horizontal viewing area. Generally, since the horizontal viewing area at is more visible than a vertical viewing area, contrast ratio and clarity in the horizontal viewing area affects viewing quality for observers than the vertical viewing area.

As a result, it is necessary to restrict the area of leakage of light in dark state within the vertical viewing area, rather than the horizontal viewing area.

SUMMARY OF THE INVENTION

An object of the present invention is to provide an LCD adopting an optical uniaxial phase compensating film. The compensating value of the optical uniaxial phase compensating film can be adjusted by adjusting thickness of the optical uniaxial phase compensating film or the refractive index of the optical uniaxial phase compensating film. The advantage of the LCD adopting the optical uniaxial phase compensating film is that the area of leakage of light in dark state is restricted to the vertical viewing area.

According to the present invention, a liquid crystal display (LCD) comprises a backlight source for generating light; a first triacetate cellulose (TAC) film; a first polyvinyl alcohol (PVA) film; a first optical uniaxial phase compensating film, for providing a first compensating value and a second compensating value by adjusting thickness of the first optical uniaxial phase compensating film and by adjusting a first refractive index, a second refractive index, and a third refractive index corresponding to light in a first direction, the light in a second direction, and the light in a third direction, respectively; a liquid crystal (LC) cell; a second optical uniaxial phase compensating film, for providing a third compensating value by adjusting thickness of the second optical uniaxial phase compensating film and by adjusting a fourth refractive index, a fifth refractive index, and a sixth refractive index corresponding to the light in the first direction, the light in the second direction, and the light in the third direction, respectively; a second PVA film; and a second TAC film. Light leakage in dark state at a wide viewing angle being controlled according to the first compensating value, the second compensating value, and the third compensating value in the LCD. The first compensating value is determined by an equation as follows: $Ro_A = (Nx_A - Ny_A) \times D_A$ where RthA indicates the first compensating value, NxA and NyA indicate refractive indexes corresponding to the X- and Y-axes of three-dimensional Cartesian coordinates for the first optical uniaxial phase compensating film, respectively, and DA indicates thickness of the first optical uniaxial phase compensating film. An optical path difference of the LC cell is determined by $(ne-no) \times d$, the optical path difference is between 305.8 nm and 324.2 nm, where ne and no indicate an extraordinary refractive index and an ordinary refractive index of the LC cell, respectively, d indicates thickness of the LC cell, the first compensating value of the first optical uniaxial phase compensating film is between 55 nm and 78 nm, and the second compensating value of the first optical uniaxial phase compensating film is between 208 nm and 293 nm, the third compensating value of the second optical uniaxial phase compensating film is between the $Y_1$ nm and $Y_2$ nm where $Y_1 = 0.004174x2 - 3.119x + 555.5$ and $Y_2 = -0.005882x2 + 1.733x + 25.9$ stand, and x indicates the second compensating value.

In one aspect of the present invention, the second compensating value is determined by an equation as follows: $Rth_A = [(Nx_A + Ny_A)/2 - Nz_A] \times D_A$ where $Rth_A$ indicates the second compensating value, NxA, NyA, and NzA indicate refractive indexes corresponding to the X-, Y-, and Z-axes of three-dimensional Cartesian coordinates for the first optical uniaxial phase compensating film, respectively, and DA indicates thickness of the first optical uniaxial phase compensating film.

In another aspect of the present invention, a pretilt angle of LC molecules in the LC cell is 89 degrees.

In another aspect of the present invention, the third compensating value is determined by the fourth refractive index, the fifth refractive index, the sixth refractive index, and thickness of the second optical uniaxial phase compensating film.

In another aspect of the present invention, the first optical uniaxial phase compensating film is an A-plate compensating film, an optical axis of the first optical uniaxial phase compensating film and a surface of the first optical uniaxial phase compensating film are in parallel, the second optical uniaxial phase compensating film is a C-plate compensating film, and an optical axis of the second optical uniaxial phase compensating film is vertical to a surface of the second optical uniaxial phase compensating film.

In still another aspect of the present invention, the LCD further comprises a first pressure sensitive adhesive (PSA). The first PSA is disposed between the first optical uniaxial phase compensating film and the LC cell.

In yet another aspect of the present invention, the LCD further comprises a second PSA. The second PSA is disposed between the second optical uniaxial phase compensating film and the LC cell.

According to the present invention, a liquid crystal display (LCD) comprises a backlight source for generating light; a first triacetate cellulose (TAC) film; a first polyvinyl alcohol (PVA) film; a first optical uniaxial phase compensating film, for providing a first compensating value and a second compensating value by adjusting thickness of the first optical uniaxial phase compensating film and by adjusting a first refractive index, a second refractive index, and a third refractive index corresponding to light in a first direction, the light in a second direction, and the light in a third direction, respectively; a liquid crystal (LC) cell; a second optical uniaxial phase compensating film, for providing a third compensating value by adjusting thickness of the second optical uniaxial phase compensating film and by adjusting a fourth refractive index, a fifth refractive index, and a sixth refractive index corresponding to the light in the first direction, the light in the second direction, and the light in the third direction, respectively; a second PVA film; and a second TAC film. Light leakage in dark state at a wide viewing angle is controlled according to the first compensating value, the second compensating value, and the third compensating value in the LCD. The first compensating value is determined by an equation as follows: $Ro_A = (Nx_A - Ny_A) \times D_A$ where RthA indicates the first compensating value, NxA and NyA indicate refractive indexes corresponding to the X- and Y-axes of three-dimensional Cartesian coordinates for the first optical uniaxial phase compensating film, respectively, and DA indicates thickness of the first optical uniaxial phase compensating film. The first compensating value of the first optical uniaxial phase compensating film is between 55 nm and 78 nm In another aspect of the present invention, an optical path difference of the LC cell is determined by (ne−no)×d, the optical path difference is between 305.8 nm and 324.2 nm, where ne and no indicate an extraordinary refractive index and an ordinary refractive index of the LC cell, respectively, d indicates thickness of the LC cell.

In another aspect of the present invention, the second compensating value is determined by an equation as follows: $Rth_A = [(Nx_A + Ny_A)/2 - Nz_A] \times D_A$ where RthA indicates the second compensating value, NxA, NyA, and NzA indicate refractive indexes corresponding to the X-, Y-, and Z-axes of three-dimensional Cartesian coordinates for the first optical uniaxial phase compensating film, respectively, and DA indicates thickness of the first optical uniaxial phase compensating film.

In another aspect of the present invention, the second compensating value of the first optical uniaxial phase compensating film is between 208 nm and 293 nm.

In another aspect of the present invention, a pretilt angle of LC molecules in the LC cell is 89 degrees.

In another aspect of the present invention, the third compensating value is determined by the fourth refractive index, the fifth refractive index, the sixth refractive index, and thickness of the second optical uniaxial phase compensating film.

In another aspect of the present invention, the third compensating value of the second optical uniaxial phase compensating film is between the $Y_1$ nm and $Y_2$ nm where $Y_1 = 0.004174x2 - 3.119x + 555.5$ and $Y_2 = -0.005882x2 + 1.733x + 25.9$ stand, and x indicates the second compensating value.

In another aspect of the present invention, the first optical uniaxial phase compensating film is an A-plate compensating film, an optical axis of the first optical uniaxial phase compensating film and a surface of the first optical uniaxial phase compensating film are in parallel. The second optical uniaxial phase compensating film is a C-plate compensating film, and an optical axis of the second optical uniaxial phase compensating film is vertical to a surface of the second optical uniaxial phase compensating film.

In still another aspect of the present invention, the LCD further comprises a first pressure sensitive adhesive (PSA). The first PSA is disposed between the first optical uniaxial phase compensating film and the LC cell.

In yet another aspect of the present invention, the LCD further comprises a second PSA. The second PSA is disposed between the second optical uniaxial phase compensating film and the LC cell.

Compared with prior art, the present invention comprises an LCD comprising an optical uniaxial phase compensating film. When optical path difference of the LC cell is between 305.8 nm and 324.2 nm (the optical path difference which the wavelength of 550 nm corresponds to) and that the pretilt angle of LC molecules is 89 degrees, the first compensating value $Ro_A$ of the first optical uniaxial phase compensating film needs to be between 55 nm and 78 nm and the second compensating value $Rth_A$ of the first optical uniaxial phase compensating film 123 needs to be between 208 nm and 293 nm. Besides, the third compensating value $Rth_C$ of the second optical uniaxial phase compensating film needs to be between the $Y_1$ nm and $Y_2$ nm where $Y_1 = 0.004174x2 - 3.119x + 555.5$ and $Y_2 = -0.005882x2 + 1.733x + 25.9$ stand, and x indicates the second compensating value $Rth_A$. The present invention properly adopts the first compensating value $Ro_A$ of the first optical uniaxial phase compensating film, the second compensating value $Rth_A$ of the first optical uniaxial phase compensating film, and the third compensating value $Rth_C$ of the second optical uniaxial phase compensating film. Serious light leakage in dark state in the area at the horizontal viewing angle in the conventional optical uniaxial phase compensating film is effectively improved if the present invention is adopted. Besides, both of the contrast ratio and the clarity in the area at the horizontal viewing angle are improved as well.

These and other features, aspects and advantages of the present disclosure will become understood with reference to the following description, appended claims and accompanying figures.

DETAILED DESCRIPTION OF THE PREFERRED EMBODIMENTS

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Figure 3:
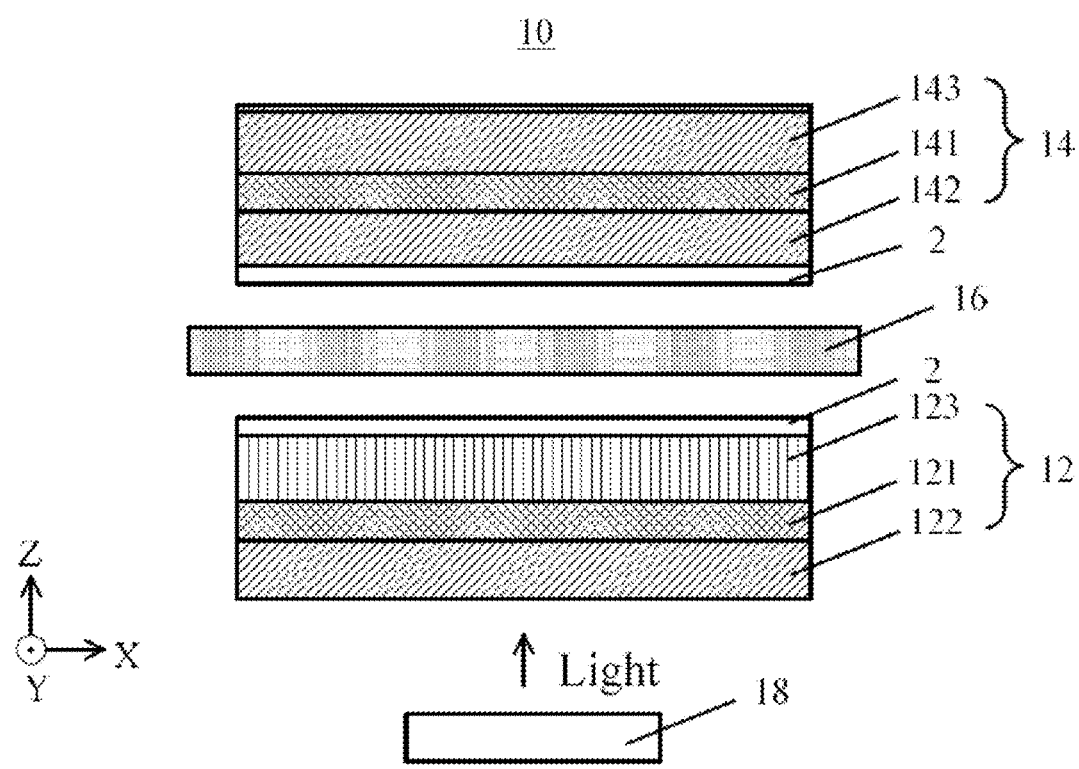
FIG. 3 shows a schematic diagram of an LCD according to a preferred embodiment of the present invention.

Please refer to FIG. 3. FIG. 3 shows a schematic diagram of an LCD 10 according to a preferred embodiment of the present invention. The LCD 10 comprises a liquid crystal (LC) cell 16, a first polarizer 12, a second polarizer 14, and a backlight source 18. The backlight source 18 is used for generating light. The LC cell 16 is glued to an area between the first polarizer 12 and the second polarizer 14 with a pressure sensitive adhesive (PSA) 2. The first polarizer 12 and the second polarizer 14 are used for deflecting an incident light. A first optical axis of the first polarizer 12 is perpendicular to a second optical axis of the second polarizer 14.

The first polarizer 12 comprises a first polyvinyl alcohol (PVA) film 121, a first triacetate cellulose (TAC) film 122, and a first optical uniaxial phase compensating film 123. The PVA film 121 is inserted between the first TAC film 122 and the first optical uniaxial phase compensating film 123. The second polarizer 14 comprises a second PVA film 141, a second optical uniaxial phase compensating film 142, and a third TAC film 143. The second PVA film 141 is inserted between the second optical uniaxial phase compensating film 142 and the third TAC film 143. In this embodiment, the first optical uniaxial phase compensating film 123 is an A-plate compensating film. The optical axis of the first optical uniaxial phase compensating film 123 and the surface of the first optical uniaxial phase compensating film 123 are in parallel. The second optical uniaxial phase compensating film 142 is a C-plate compensating film. The optical axis of the second optical uniaxial phase compensating film 142 is vertical to the surface of the second optical uniaxial phase compensating film 142. The first optical uniaxial phase compensating film 123 is used for providing a first compensating value $Ro_A$ and a second compensating value $Rth_A$. The second optical uniaxial phase compensating film 142 is used for providing a third compensating value $Rth_C$. The slow axis of the first optical uniaxial phase compensating film 123 forms a 90 degree angle with the absorption axis of the first PVA film 121. The slow axis of the second optical uniaxial phase compensating film 142 forms a zero degree angle with the absorption axis of the second PVA film 141. The method of determination of the first compensating value, the second compensating value, and the third compensating value will be detailed in the following description. The optical path difference of the LC cell 16, the compensating value of the first optical uniaxial phase compensating film 123, and the compensating values of the second optical uniaxial phase compensating film 142 are values corresponding to a wavelength of 550 nm in the following embodiment.

Figure 4:
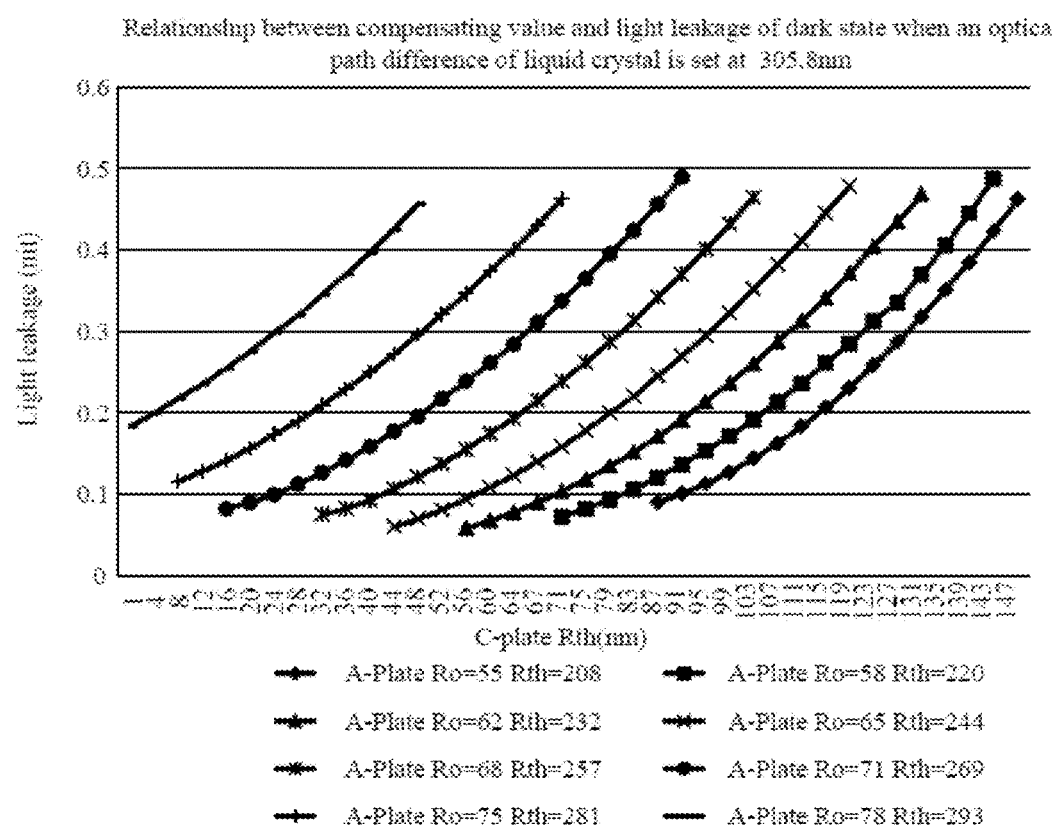
FIGS. 4 to 6 respectively show relationship diagrams between leakage values and different first compensating values $Ro_A$ of the first optical uniaxial phase compensating film, different second compensating values $Rth_A$ of the first optical uniaxial phase compensating film, and different third compensating values $Rth_C$ of the second optical uniaxial phase compensating film on condition that the optical path difference of the LC cell is 305.8 nm, 315 nm, and 324.2 nm.
Figure 5:
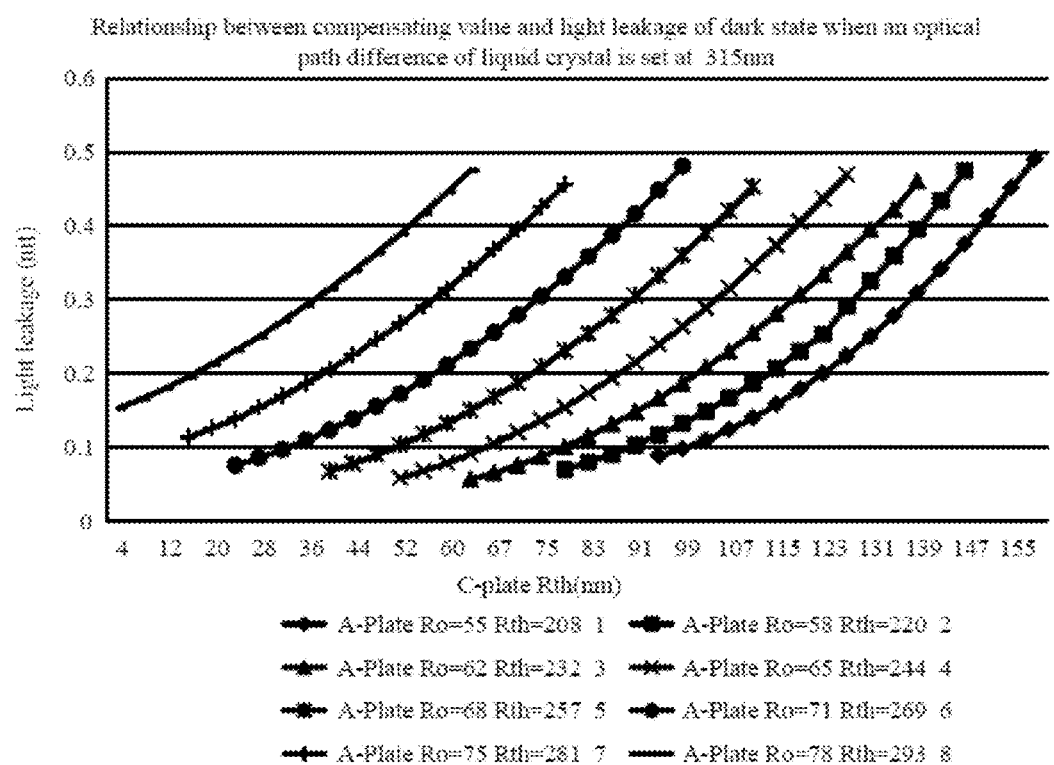
Figure 6:
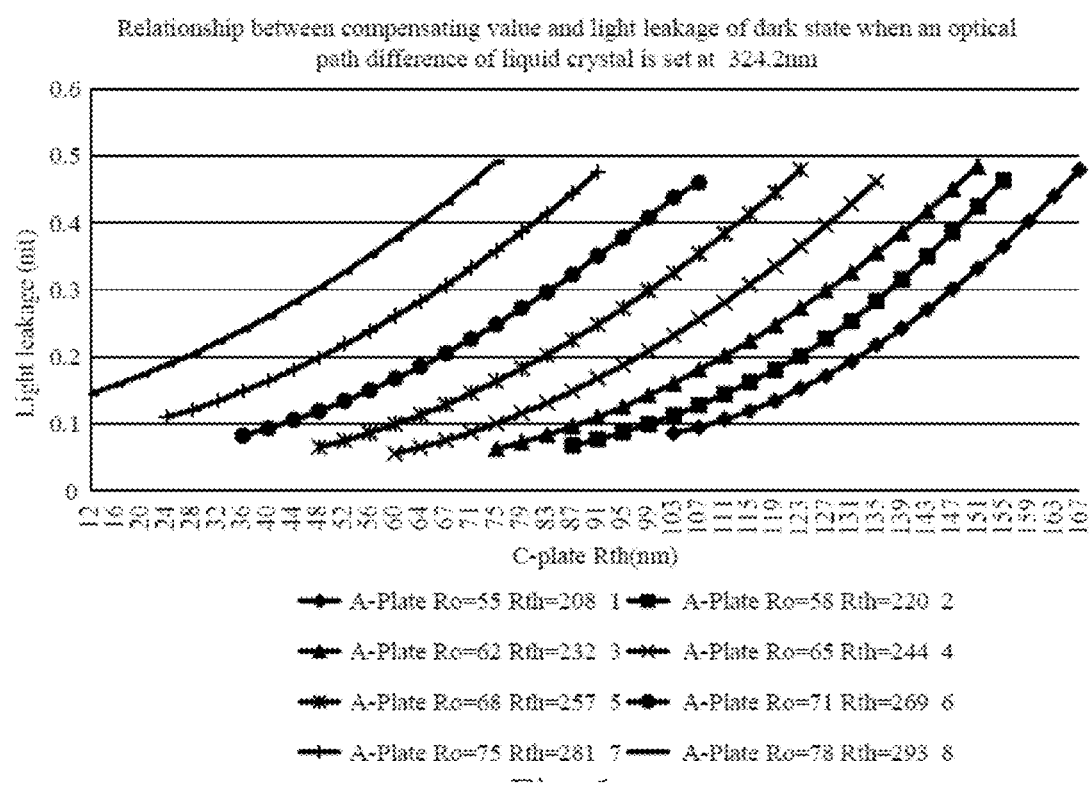

Please refer to FIGS. 4 to 6. FIGS. 4 to 6 respectively show relationship diagrams between leakage values and different first compensating values $Ro_A$ of the first optical uniaxial phase compensating film 123, different second compensating values $Rth_A$ of the first optical uniaxial phase compensating film 123, and different third compensating values $Rth_C$ of the second optical uniaxial phase compensating film 142 on condition that the optical path difference of the LC cell 16 is 305.8 nm, 315 nm, and 324.2 nm. For a simpler description, the incident light generated by the backlight source 18 belongs to Lambertian distribution in this embodiment. Luminance in the center of the incident light is defined as 100 nit. The pretilt angle of the LC molecules in the LC cell 16 is 89 angles. The optical path difference of the LC cell 16 is determined by $\Delta n \times d$. The optical path difference of the LC cell 16 is between 305.8 nm and 324.2 nm where ne indicates an extraordinary refractive index of the LC cell 16, ne and no indicate an extraordinary refractive index and an ordinary refractive index of the LC cell 16, respectively, and d indicates thickness of the LC cell 16.

In FIGS. 4-6, $Ro_A$ indicates the first compensating value of the first optical uniaxial phase compensating film 123 in the X-Y plane. $Rth_A$ indicates the second compensating value of the first optical uniaxial phase compensating film 123 in the Z-axial direction. $Rth_C$ indicates the third compensating value of the second optical uniaxial phase compensating film 142 in the Z-axial direction. $Ro_A$, $Rth_A$, and $Rth_C$ are determined by values plugged into the following equations:

$$Ro_A = (Nx_A - Ny_A) \times D_A \quad \text{Equation 1,}$$

$$Rth_A = [(Nx_A + Ny_A)/2 - Nz_A] \times D_A \quad \text{Equation 2,}$$

$$Rth_C = [(Nx_C + Ny_C)/2 - Nz_C] \times D_C \quad \text{Equation 3,}$$

where $Nx_A$, $Ny_A$, and $Nz_A$ indicate refractive indexes of the light generated by the backlight source 18 corresponding to the X-, Y-, and Z-axes of three-dimensional Cartesian coordinates, respectively, when the light passes through the first optical uniaxial phase compensating film 123. $Nx_C$, $Ny_C$, and $Nz_C$ indicate refractive indexes of the light generated by the backlight source 18 corresponding to the X-, Y-, and Z-axes of three-dimensional Cartesian coordinates, respectively, when the light passes through the second phase compensating film 142. $D_A$ and $D_C$ indicate thickness of the first optical uniaxial phase compensating film 123 and thickness of the second phase compensating film 142, respectively.

FIGS. 4-6 show that in different LC optical path differences, the compensating value of the first optical uniaxial phase compensating film 123 and the compensating value of the second optical uniaxial phase compensating film 142 have similar influential tendencies on the light leakage in dark state. In other words, in different LC optical path differences, the range of the compensating value is the same for the minimum light leakage in dark state.

As shown in FIGS. 4 to 6, different pretilt angles of LC molecules and the different compensating values are simulated and the pretilt angle of 89 degrees is calculated. In the range of 305.8 nm≤Δn×d≤324.2 nm and the light leakage in dark state is smaller than 0.2 nit, the range of compensating value of the first optical uniaxial phase compensating film 123 and the range of compensating value of the second optical uniaxial phase compensating film 142 are calculated. That is, on condition that the optical path difference of the LC cell is between 305.8 nm and 324.2 nm and that the pretilt angle of LC molecules is 89 degrees, the LCD 10 can still refrain light from leaking based on the first compensating value $Ro_A$ of the first optical uniaxial phase compensating film 123, the second compensating value $Rth_A$ of the first optical uniaxial phase compensating film 123, and the third compensating value $Rth_C$ of the second optical uniaxial phase compensating film 142. It is necessary to control the first compensating value $Ro_A$ of the first optical uniaxial phase compensating film 123 to be between 55 nm and 78 nm and the second compensating value $Rth_A$ of the first optical uniaxial phase compensating film 123 to be between 208 nm and 293 nm. Further, it is necessary to adjust the third compensating value $Rth_C$ of the second optical uniaxial phase compensating film 142 based on the adjusted the second compensating value $Rth_A$ to control the third compensating value $Rth_C$ to be between the $Y_1$ nm and $Y_2$ nm where $Y_1=0.004174x2-3.119x+555.5$ and $Y_2=-0.005882x2+1.733x+25.9$, and x indicates the second compensating value $Rth_A$.

Therefore, the first compensating value $Ro_A$ of the first optical uniaxial phase compensating film 123, the second compensating value $Rth_A$ of the first optical uniaxial phase compensating film 123, and the third compensating value $Rth_C$ of the second optical uniaxial phase compensating film 142 are all for the incident light with the wavelength of 550 nm. When a compensating value is within the above-mentioned range, the LCD will obtain the best compensation and the minimum light leakage in dark state.

Figure 7:
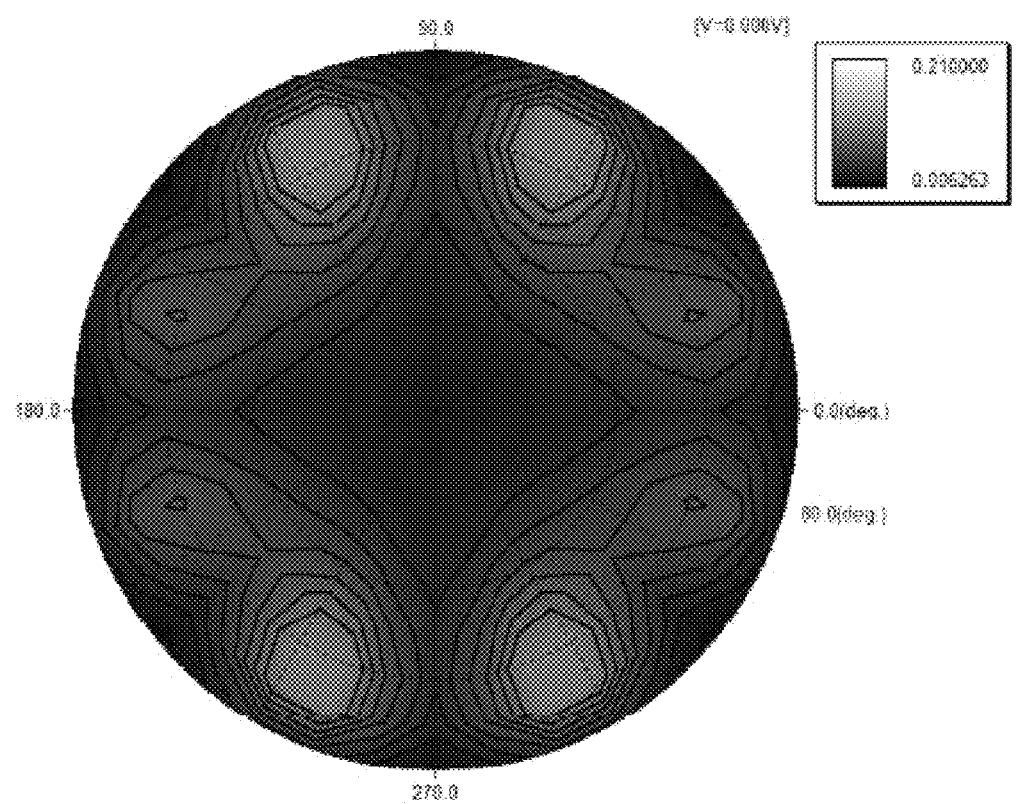
FIG. 7 shows a simulation of a distribution of light leakage in dark state upon conditions that optical path difference of the LC cell of 305.8 nm, the first optical uniaxial phase compensating film with the first compensating value $Ro_A$ of 71 nm and the second compensating value $Rth_A$ of 269 nm and by the second optical uniaxial phase compensating film with the third compensating value $Rth_A$ of 24 nm.
Figure 8:
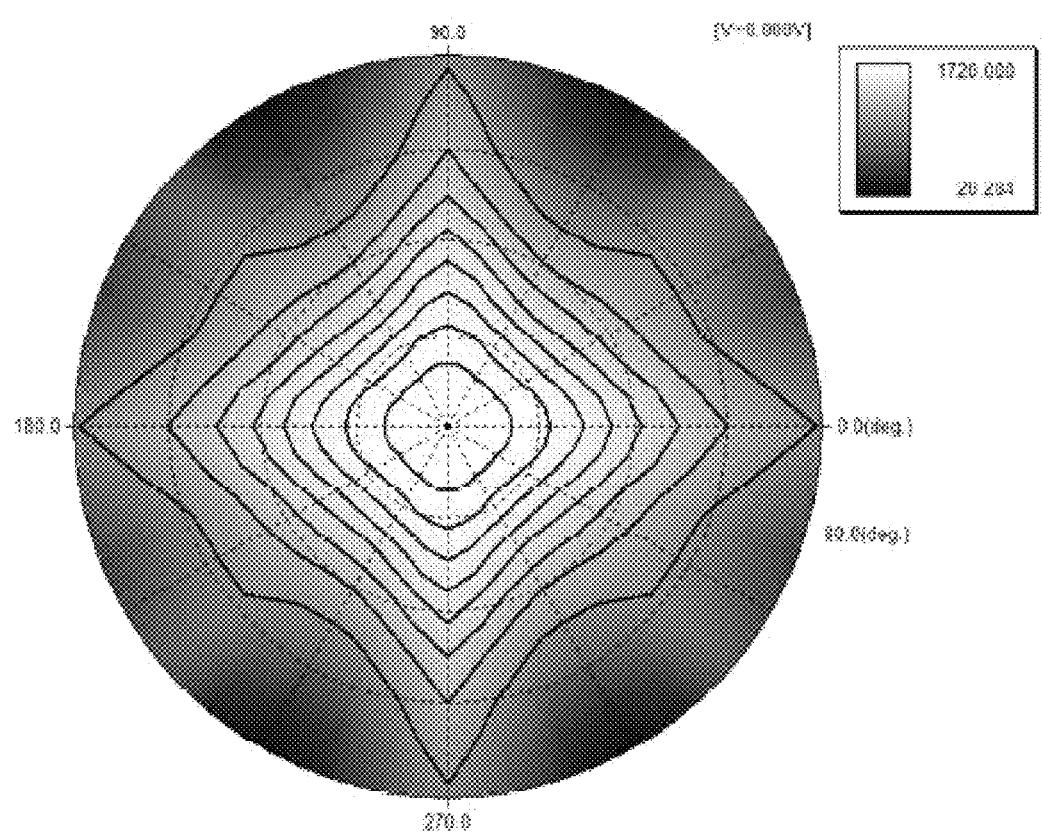
FIG. 8 shows a simulation of a distribution of contrast over all viewing angles based on the conditions illustrated in FIG. 7.
Figure 9:
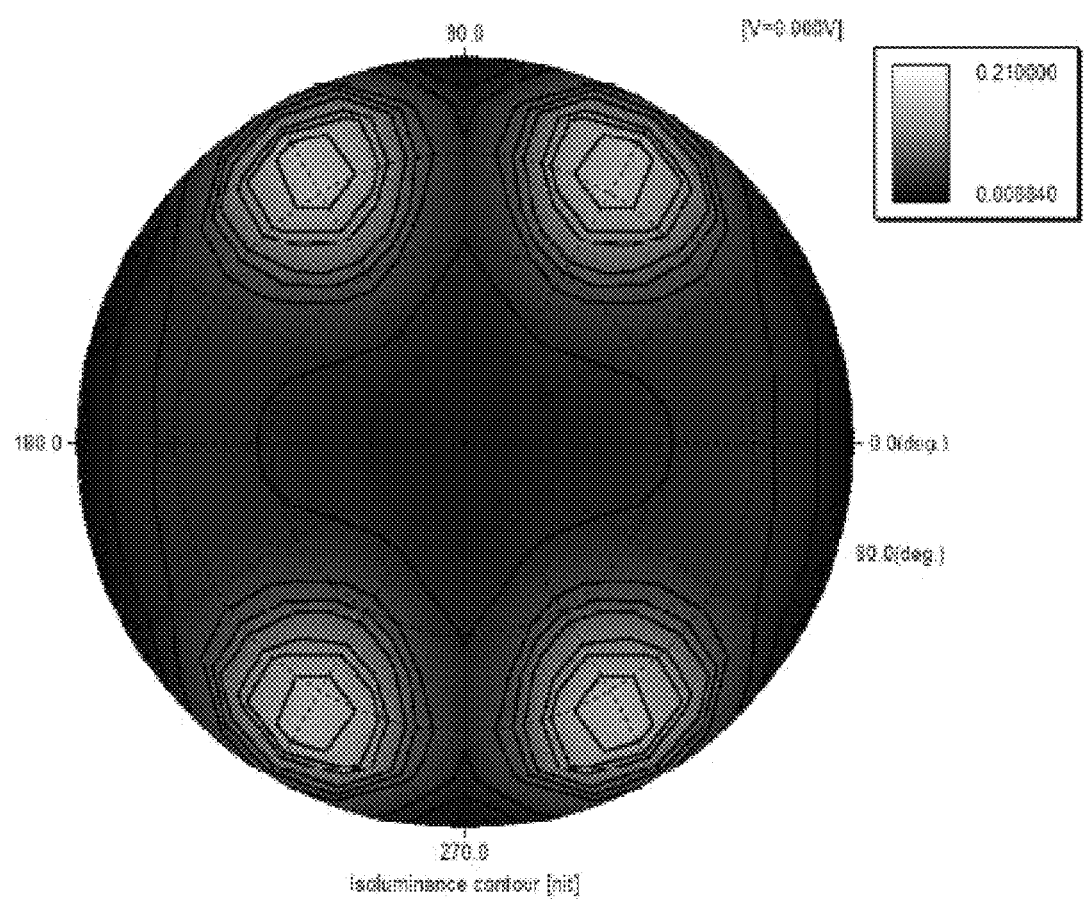
FIG. 9 shows a simulation of a distribution of light leakage in dark state upon conditions that optical path difference of the LC cell of 315 nm, the first optical uniaxial phase compensating film with the first compensating value $Ro_A$ of 65 nm and the second compensating value $Rth_A$ of 244 nm and by the second optical uniaxial phase compensating film with the third compensating value $Rth_A$ of 75 nm.
Figure 10:
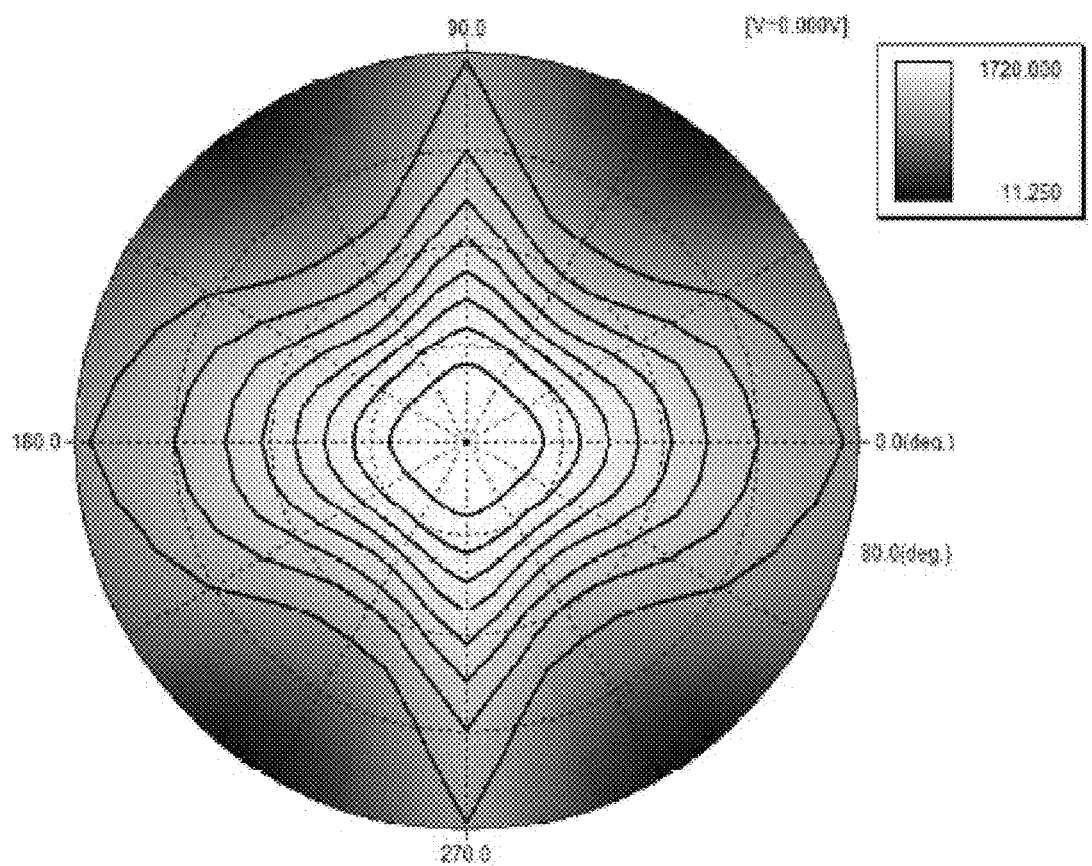
FIG. 10 shows a simulation of a distribution of contrast over all viewing angles based on the conditions illustrated in FIG. 9.
Figure 11:
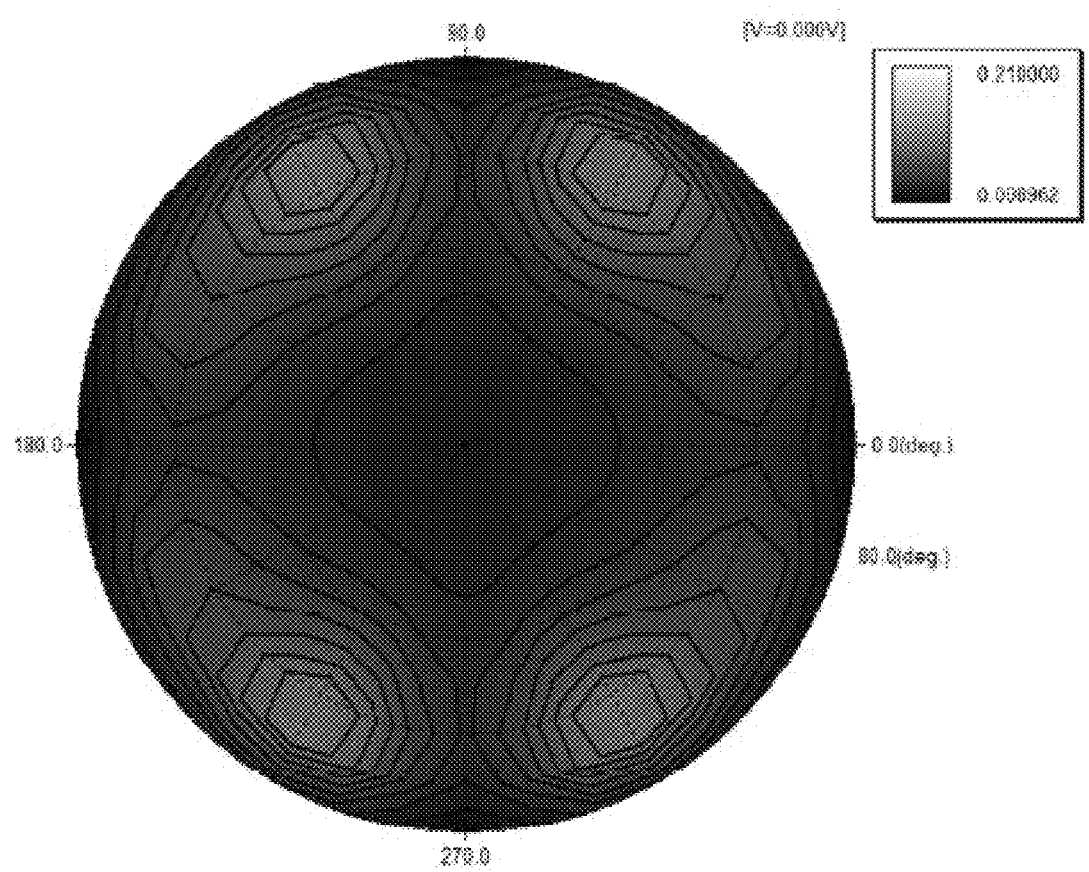
FIG. 11 shows a simulation of a distribution of light leakage in dark state upon conditions that optical path difference of the LC cell of 324.2 nm, the first optical uniaxial phase compensating film with the first compensating value $Ro_A$ of 58 nm and the second compensating value $Rth_A$ of 220 nm and by the second optical uniaxial phase compensating film with the third compensating value $Rth_A$ of 95 nm.
Figure 12:
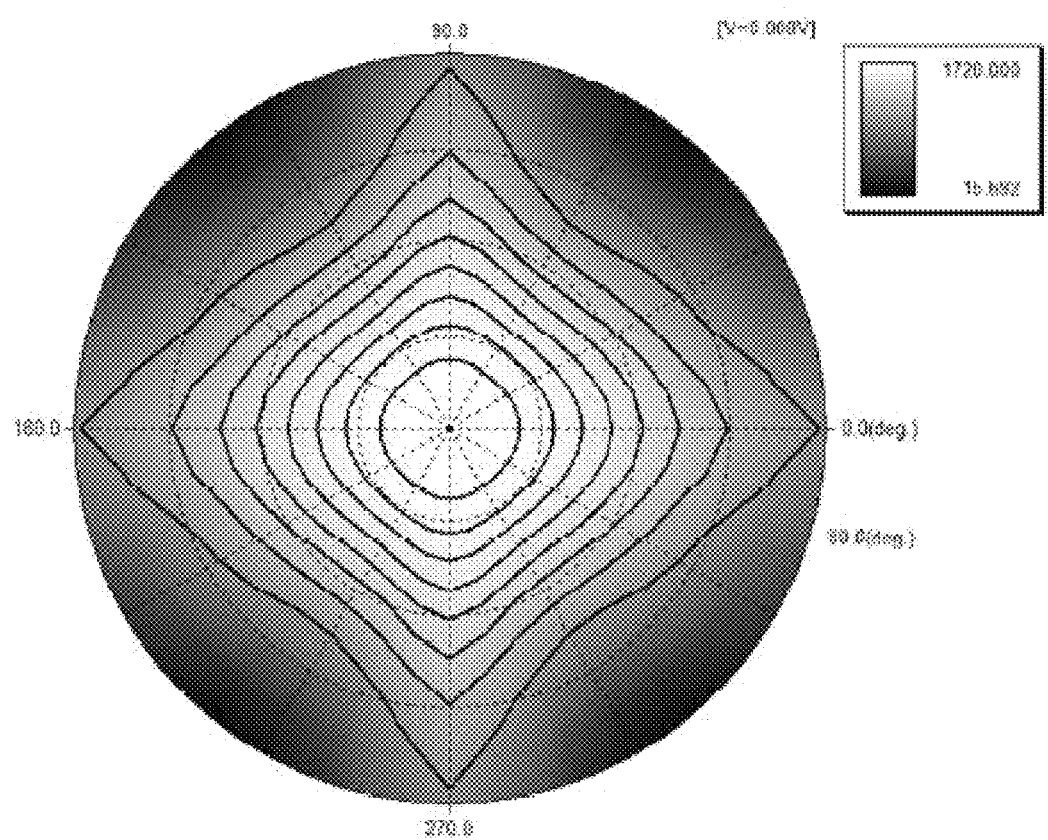
FIG. 12 shows a simulation of a distribution of contrast over all viewing angles based on the conditions illustrated in FIG. 11.

Please refer to FIGS. 7 through FIG. 12, FIG. 7 shows a simulation of a distribution of light leakage in dark state upon conditions that optical path difference of the LC cell 16 of 305.8 nm, the first optical uniaxial phase compensating film 123 with the first compensating value $Ro_A$ of 71 nm and the second compensating value $Rth_A$ of 269 nm and by the second optical uniaxial phase compensating film 142 with the third compensating value $Rth_A$ of 24 nm. FIG. 8 shows a simulation of a distribution of contrast over all viewing angles based on the conditions illustrated in FIG. 7. FIG. 9 shows a simulation of a distribution of light leakage in dark state upon conditions that optical path difference of the LC cell 16 of 315 nm, the first optical uniaxial phase compensating film 123 with the first compensating value $Ro_A$ of 65 nm and the second compensating value $Rth_A$ of 244 nm and by the second optical uniaxial phase compensating film 142 with the third compensating value $Rth_A$ of 75 nm. FIG. 10 shows a simulation of a distribution of contrast over all viewing angles based on the conditions illustrated in FIG. 9. FIG. 11 shows a simulation of a distribution of light leakage in dark state upon conditions that optical path difference of the LC cell 16 of 324.2 nm, the first optical uniaxial phase compensating film 123 with the first compensating value $Ro_A$ of 58 nm and the second compensating value $Rth_A$ of 220 nm and by the second optical uniaxial phase compensating film 142 with the third compensating value $Rth_A$ of 95 nm. FIG. 12 shows a simulation of a distribution of contrast over all viewing angles based on the conditions illustrated in FIG. 11.

Figure 1:
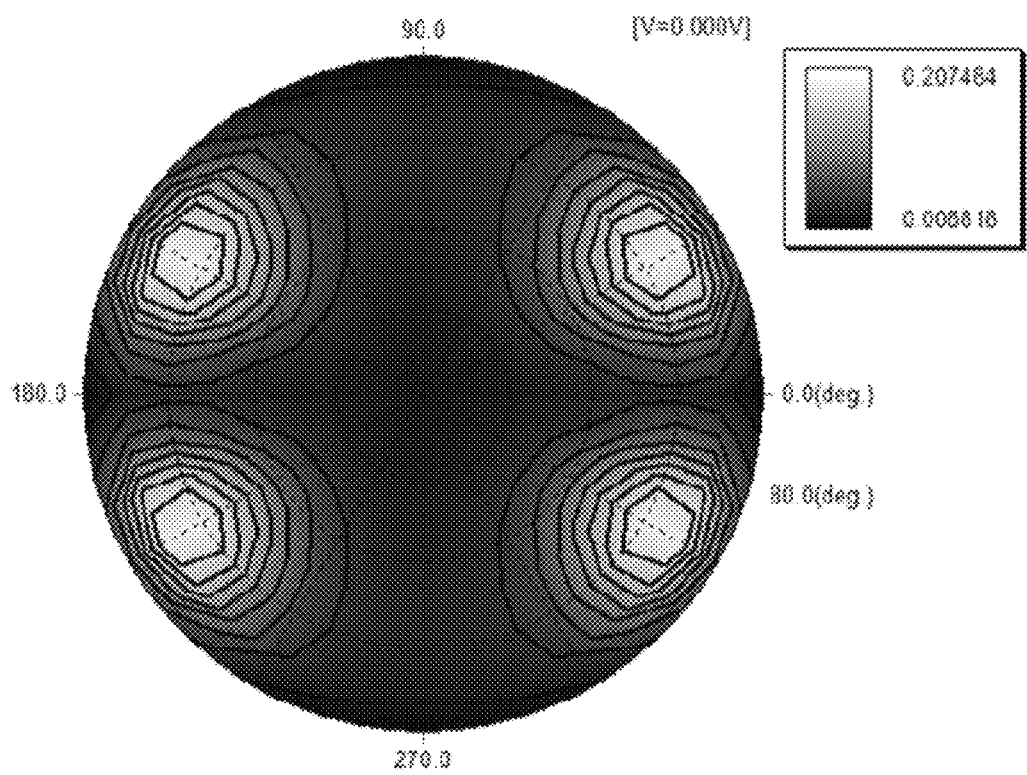
FIG. 1 shows a simulation of a distribution of light leakage in dark state after being compensated by a conventional uniaxial retardation film.
Figure 2:
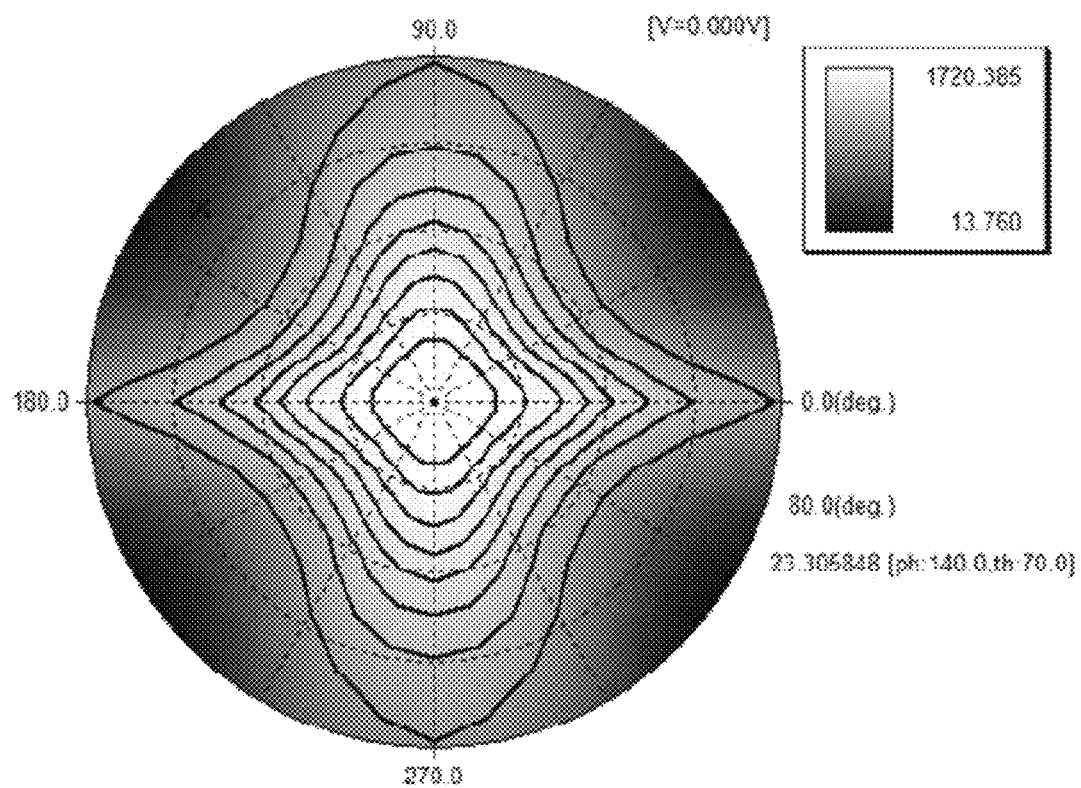
FIG. 2 shows a simulation of a distribution of contrast over all viewing angles after being compensated by the conventional uniaxial retardation film.

When comparing FIGS. 7, 9, 11 with FIG. 1, it is observed that, after being compensated by the first optical uniaxial phase compensating film 123 and the second optical uniaxial phase compensating film 142 according to the embodiment of the present invention, the light leakage in dark state is much less than that after being compensated by the prior art, and the light leakage area is restricted to a narrower area at vertical viewing angle. When comparing FIGS. 8, 10, 12 with FIG. 2, it is observed that the contrast distribution over all viewing angles after being compensated by the compensation system according to the embodiment of the present invention is superior that after being compensated by the prior art, especially in the area at horizontal viewing angle.

The person skilled in the art can adjust the refractive index or the thickness of the first optical uniaxial phase compensating film 123 and the refractive index or the thickness of the second optical uniaxial phase compensating film 142 using Equation 1, Equation 2, and Equation 3 after obtaining the first compensating value $Ro_A$ of the first optical uniaxial phase compensating film 123, the second compensating value $Rth_A$ of the first optical uniaxial phase compensating film 123, and the third compensating value $Rth_C$ of the second optical uniaxial phase compensating film 142.

Compared with the prior art, the present invention properly adopts the first compensating value $Ro_A$ of the first optical uniaxial phase compensating film 123, the second compensating value $Rth_A$ of the first optical uniaxial phase compensating film 123, and the third compensating value $Rth_C$ of the second optical uniaxial phase compensating film 142. Serious light leakage in dark state in the area at the horizontal viewing angle in the conventional optical uniaxial phase compensating film is effectively improved if the present invention is adopted. Besides, both of the contrast ratio and the clarity in the area at the horizontal viewing angle are improved as well.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A liquid crystal display (LCD), comprising:
    a backlight source for generating light;
    a first triacetate cellulose (TAC) film;

a first polyvinyl alcohol (PVA) film;

a first optical uniaxial phase compensating film, for providing a first compensating value and a second compensating value by adjusting thickness of the first optical uniaxial phase compensating film and by adjusting a first refractive index, a second refractive index, and a third refractive index corresponding to light in a first direction, the light in a second direction, and the light in a third direction, respectively;

a liquid crystal (LC) cell;

a second optical uniaxial phase compensating film, for providing a third compensating value by adjusting thickness of the second optical uniaxial phase compensating film and by adjusting a fourth refractive index, a fifth refractive index, and a sixth refractive index corresponding to the light in the first direction, the light in the second direction, and the light in the third direction, respectively;

a second PVA film; and a second TAC film;

light leakage in dark state at a wide viewing angle being controlled according to the first compensating value, the second compensating value, and the third compensating value in the LCD;

the first compensating value being determined by an equation as follows: $Ro_A=(Nx_A-Ny_A) \times D_A$ where $Ro_A$ indicates the first compensating value, $Nx_A$ and $Ny_A$ indicate refractive indexes corresponding to the X- and Y-axes of three-dimensional Cartesian coordinates for the first optical uniaxial phase compensating film, respectively, and $D_A$ indicates thickness of the first optical uniaxial phase compensating film, wherein an optical path difference of the LC cell is determined by (ne−no)×d, the optical path difference is between 305.8 nm and 324.2 nm, where ne and no indicate an extraordinary refractive index and an ordinary refractive index of the LC cell, respectively, d indicates thickness of the LC cell, the first compensating value of the first optical uniaxial phase compensating film is between 55 nm and 78 nm, and the second compensating value of the first optical uniaxial phase compensating film is between 208 nm and 293 nm, the third compensating value of the second optical uniaxial phase compensating film is between the $Y_1$ nm and $Y_2$ nm where $Y_1=0.004174x2-3.119x+555.5$ and $Y_2=-0.005882x2+1.733x+25.9$ stand, and x indicates the second compensating value.

2. The LCD as claimed in claim 1, wherein the second compensating value is determined by an equation as follows: $Rth_A=[(Nx_A+Ny_A)/2-Nz_A] \times D_A$ where $Rth_A$ indicates the second compensating value, $Nx_A$, $Ny_A$, and $Nz_A$ indicate refractive indexes corresponding to the X-, Y-, and Z-axes of three-dimensional Cartesian coordinates for the first optical uniaxial phase compensating film, respectively, and $D_A$ indicates thickness of the first optical uniaxial phase compensating film.

3. The LCD as claimed in claim 1, wherein a pretilt angle of LC molecules in the LC cell is 89 degrees.

4. The LCD as claimed in claim 1, wherein the third compensating value is determined by the fourth refractive index, the fifth refractive index, the sixth refractive index, and thickness of the second optical uniaxial phase compensating film.

5. The LCD as claimed in claim 1, wherein the first optical uniaxial phase compensating film is an A-plate compensating film, an optical axis of the first optical uniaxial phase compensating film and a surface of the first optical uniaxial phase compensating film are in parallel, the second optical uniaxial phase compensating film is a C-plate compensating film, and an optical axis of the second optical uniaxial phase compensating film is vertical to a surface of the second optical uniaxial phase compensating film.

6. The LCD as claimed in claim 1 further comprising a first pressure sensitive adhesive (PSA), wherein the first PSA is disposed between the first optical uniaxial phase compensating film and the LC cell.

7. The LCD as claimed in claim 6 further comprising a second PSA, wherein the second PSA is disposed between the second optical uniaxial phase compensating film and the LC cell.

* * * * *